United States Patent
Wong

(10) Patent No.: US 6,546,103 B1
(45) Date of Patent: Apr. 8, 2003

(54) SECURING MECHANISM FOR MOBILE PHONE

(76) Inventor: David Wong, 5F, No. 13, Alley 38, Lane 245, Sec. 2, Szchuan Rd., Pan-Chiao, Taipei Hsien (TW)

(*) Notice: Subject to any disclaimer, the term of this patent is extended or adjusted under 35 U.S.C. 154(b) by 0 days.

(21) Appl. No.: 09/557,593

(22) Filed: Apr. 24, 2000

(30) Foreign Application Priority Data

May 14, 1999 (TW) .................................. 88207759 U

(51) Int. Cl.[7] .............................................. H04M 1/00
(52) U.S. Cl. ....................................... 379/446; 379/454
(58) Field of Search ................................ 379/446, 454, 379/455; 242/379.2

(56) References Cited

U.S. PATENT DOCUMENTS 5,610,979 A * 3/1997 Yu ............................. 379/446
5,938,137 A * 8/1999 Poulson .................. 242/379.2

* cited by examiner

Primary Examiner—Jack Chiang

(57) ABSTRACT

A securing mechanism for a mobile phone comprises a spool case, a holding plate, and at least a clasp. The spool case accommodates a chain cord with a hook end. The spool case has two sides to which the holding plate and the clasp are attached, respectively. The clasp is hung on and clamps a belt, and the hook is hooked on the mobile phone. When not in use, the mobile phone is put on the holding plate After being removed from the holding plate for use, the mobile phone is still secured and will not fall down and be damaged or get lost.

1 Claim, 6 Drawing Sheets

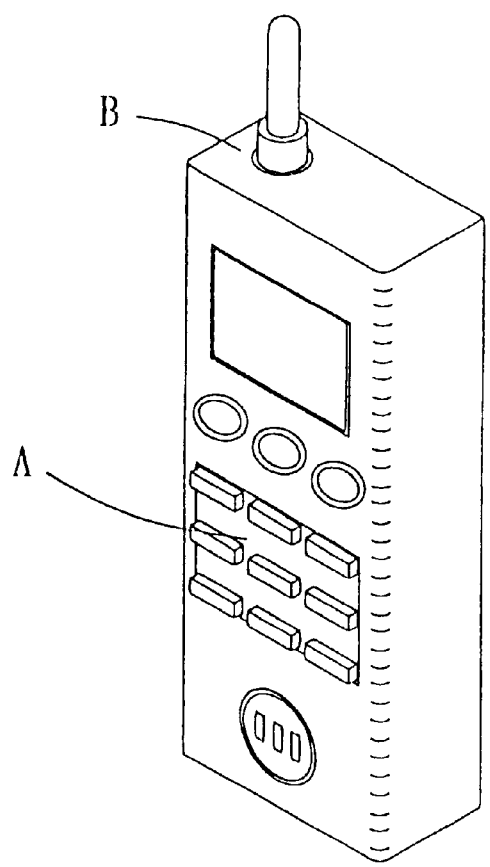
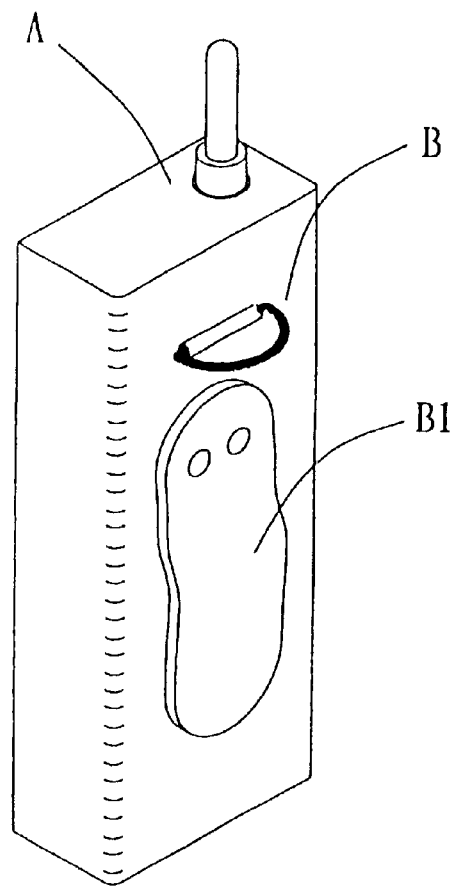
Fig. 1
(PRIOR ART)
Fig. 2
(PRIOR ART)

SECURING MECHANISM FOR MOBILE PHONE

BACKGROUND OF THE INVENTION

1. Field of the Invention

The present invention relates to a securing mechanism for a mobile phone, particularly to a securing mechanism for a mobile phone, having a clasp mechanism with a clasp to be fastened on a belt and a hook to be engaged with a leather case of the mobile phone. The mobile phone, when not used, is clasped to the belt and will not fall down during use.

2. Description of Related Art

As shown in FIGS. 1 and 2, a conventional mobile phone A has a leather case B with a rear side to which a retaining plate B1 is attached. The retaining plate B1 is used to hold the mobile phone A to a belt of a user. However, after frequent taking away of the mobile phone A from the belt, the retaining plate B1 loses elasticity and it results in a risk of the mobile phone A to fall down. Furthermore, after use, the mobile phone A often is not tightly put back on the belt and thus may fall down or get lost. Shocks, like bumping into other people, may also cause the mobile phone A to fall down and to be damaged. For these reasons, there is a demand for proper securing of a mobile phone.

SUMMARY OF THE INVENTION

The securing mechanism for a mobile phone of the present invention mainly comprises a spool case, a holding plate, and at least a clasp the spool case accommodates a chain cord with an end to which a hook is fastened. The spool case has two sides to which the holding plate and the clasp are attached, respectively.

For using the present invention, the clasp is put on the belt of the user, and the hook is hooked on a holding ring on the leather case of the mobile phone. When the mobile phone is not used, the retaining plate thereof is put over the holding plate of the present invention. After being removed from the holding plate for use, the mobile phone is still secured and will not fall down.

The main object of the present invention is to provide a securing mechanism for a mobile phone, having at least a clasp and a chain cord, which is easily wound up and secures the mobile phone.

Another object, of the present invention is to provide a securing mechanism for a mobile phone, which prevents the mobile phone from being damaged as a result of falling down.

A further object of the present invention is to provide a securing mechanism for a mobile phone, which prevents the mobile phone from being lost as a result of falling down.

BRIEF DESCRIPTION OF THE DRAWINGS

The present invention can be more fully understood by reference to the following description and accompanying drawings, in which:

FIG. 1 (prior art) is a perspective view of a conventional mobile phone;

FIG. 2 (prior art) is a perspective view of a conventional mobile phone with a retaining plate for holding;

DETAILED DESCRIPTION OF THE PREFERRED EMBODIMENTS

Figure 3:
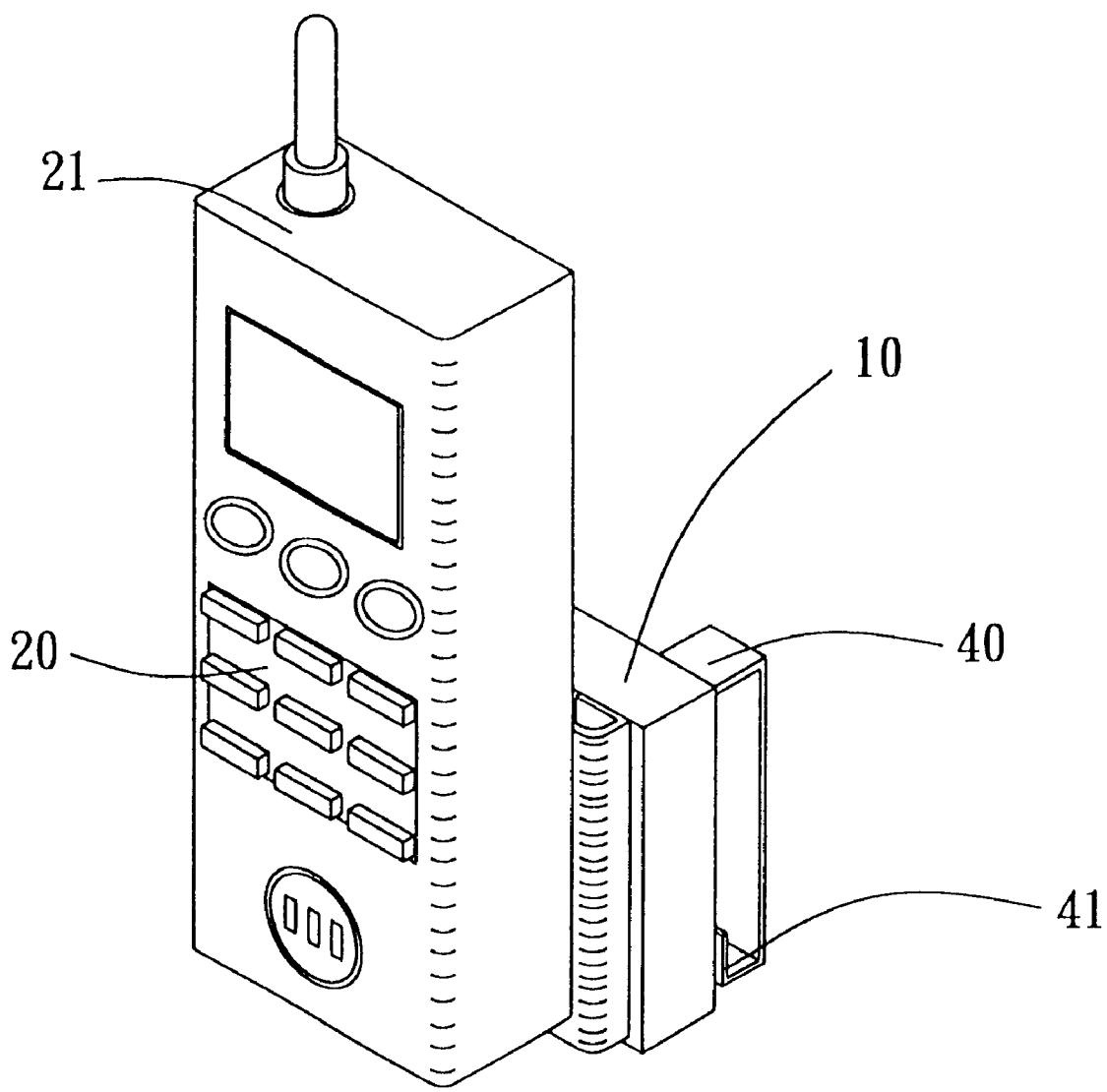
FIG. 3 is a perspective view of the securing mechanism for a mobile phone of the present invention, with the mobile phone held.
Figure 4:
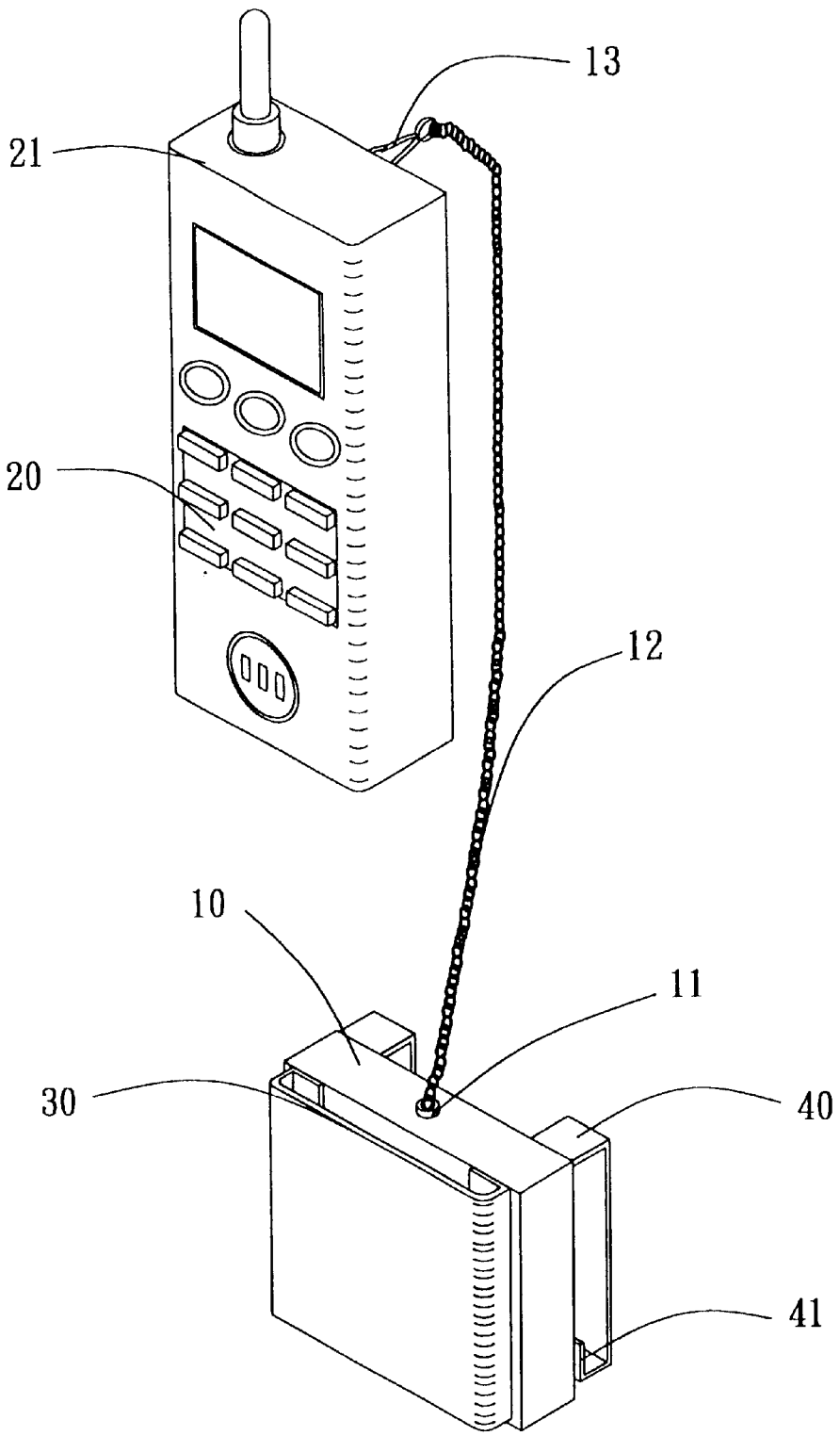
FIG. 4 is a perspective view of the securing mechanism for a mobile phone of the present invention, with the mobile phone removed for use.
Figure 5:
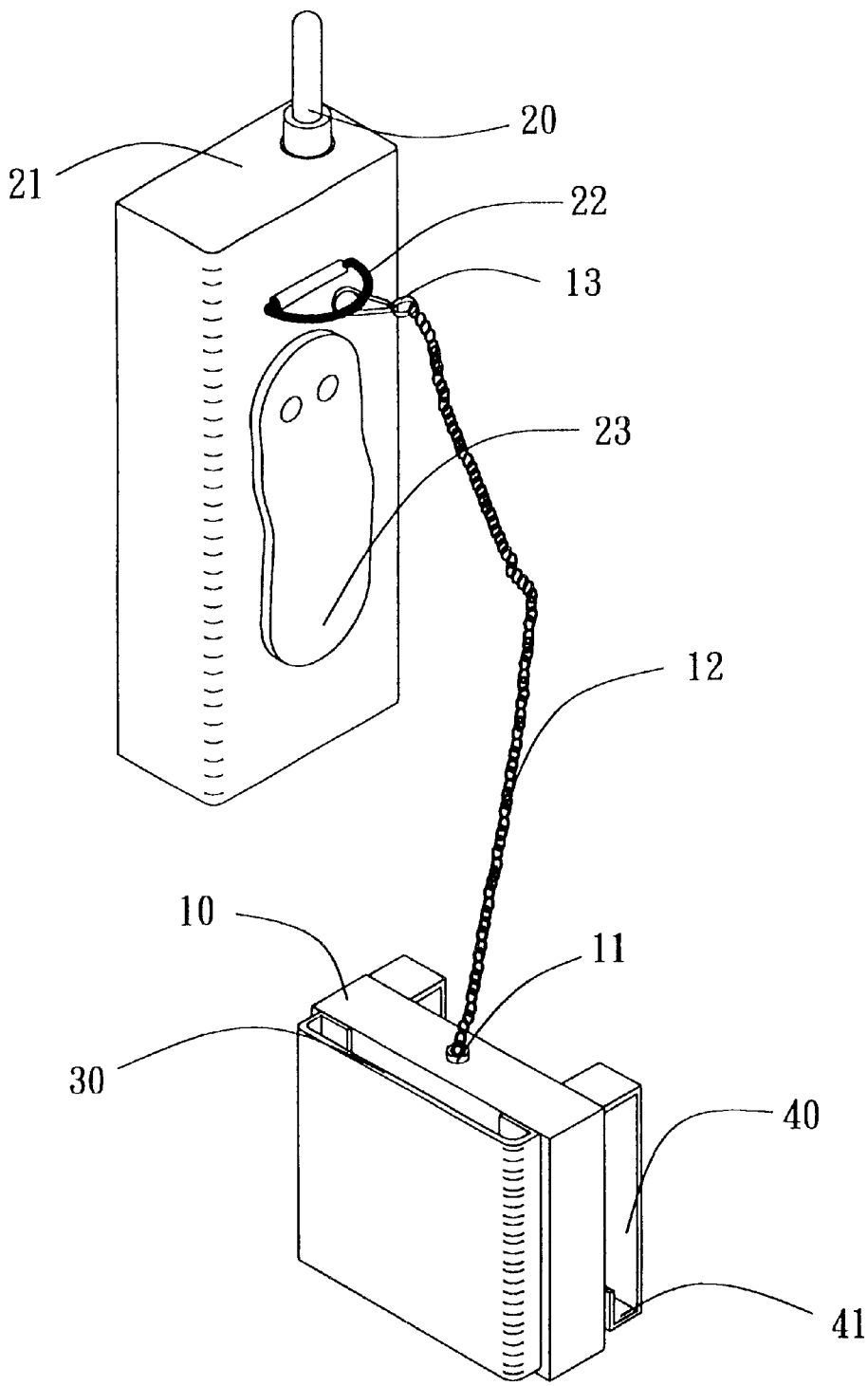
FIG. 5 is a perspective view of the securing mechanism for a mobile phone of the present invention from another viewing angle.
Figure 6:
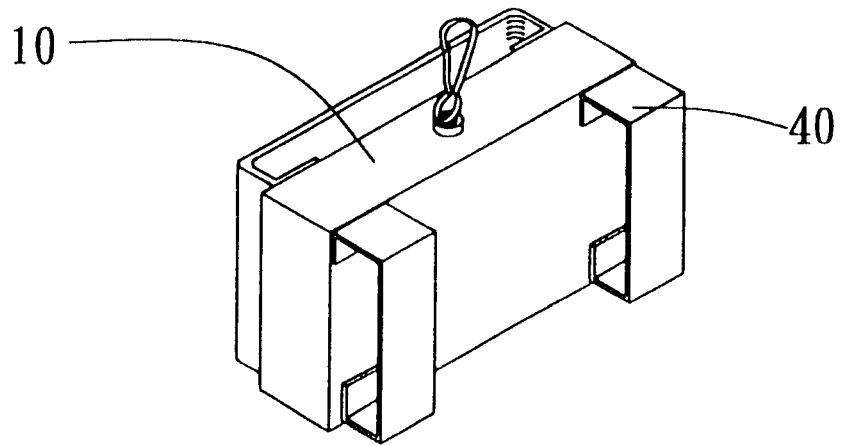
FIG. 6 is a perspective view of the clasp of the present invention in the first embodiment.

The securing mechanism for a mobile phone of the present invention is used in conjunction with a mobile phone 20 which has a leather case 21 with a holding ring 22 and a retaining plate 23 and is carried on a belt of a user. As shown in FIGS. 3, 4, and 5, the securing mechanism for a mobile phone of the present invention mainly comprises a spool case 10, a holding plate 30, and a clasp 40. The spool case 10 houses a cord 12, which has a free end to which a hook 13 is fastened. The spool case 10 has a front side, carrying the holding plate 30, and a rear side, to which the clasp 40 is attached. In a first embodiment of the present invention, the clasp 40 has two clasping rings 41 as shown in FIG. 6.

For using the present invention, the clasp 40 is hung on clamps the belt, and the engaging hook 13 is engaged with the holding ring 22 on the leather case 21 of the mobile phone 20. While the mobile phone 20 is not in use, the retaining plate 23 thereof is put on the holding plate 30. In this state, the chain cord 12 has retreated into the spool case 10. Since the mobile phone 20 in the leather case 21 is connected with the belt of the user via the cord 12, there is no risk of the mobile phone 20 falling down and being damaged or getting lost.

Figure 7:
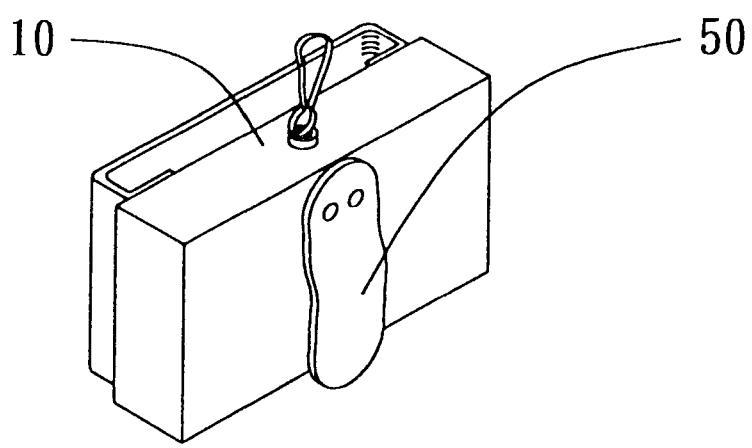
FIG. 7 is a perspective view of the clasp of the present invention in the second embodiment.

Referring to FIG. 7, in a second embodiment of the present invention the clasp 40 has a retaining plate 50 to be put on the belt of the user.

Figure 8:
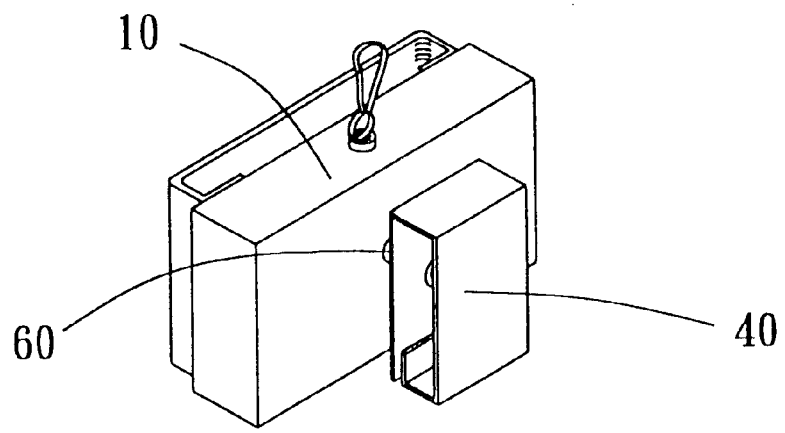
FIG. 8 is a perspective view of the clasp of the present invention in the third embodiment.
Figure 9:
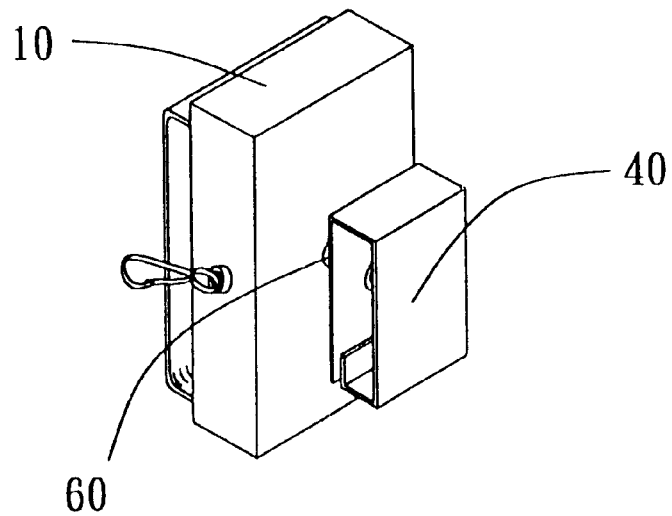
FIG. 9 is a perspective view of the clasp of the present invention in the third embodiment when turned.

Referring to FIGS. 8 and 9, in a further embodiment of the present invention the clasp 40 has a pivotal lock 60, allowing the user to fasten the mobile phone (not shown) at any angle with respect to the belt. This enhances convenience of use.

The securing mechanism of the present invention effectively secures a mobile phone during use thereof, preventing damage or loss of the mobile phone.

While the invention has been described with reference to preferred embodiments thereof, it is to be understood that modifications or variations may be easily made without departing from the spirit of this invention, which is defined by the appended claims.

What is claimed is:

1. A securing mechanism for a mobile phone used in conjunction with the mobile phone, which has a leather case with a holding ring, comprising:

a spool case; and an extendable cord with two ends, one of the ends connecting with the holding ring and the other one of the ends thereof being fixed in the spool case;

characterized in that the spool case is provided with a four-sided shape with a front side thereof being attached with a holding plate in a way of two lateral sides of the holding plate bent inward and fixed to the front side to result in a gap between the holding plate and the front side, a rear side thereof being provided with a clasp ring next to two lateral edges of the rear side respectively and an upper side thereof having a through hole for being passed with the cord.

* * * * *